US005126535A

United States Patent [19]

Porzky

[11] Patent Number: 5,126,535

[45] Date of Patent: Jun. 30, 1992

[54] FURNACE AND KILN CONSTRUCTION AND THERMAL INSULATION AND HEATING UNIT THEREFOR

[76] Inventor: Ludwig Porzky, W-430B County Trunk "O", Watertown, Wis. 53094

[21] Appl. No.: 734,052

[22] Filed: Jul. 22, 1991

Related U.S. Application Data

[63] Continuation of Ser. No. 425,935, Oct. 24, 1989, abandoned.

[51] Int. Cl.[5] ..................... A21B 1/22

[52] U.S. Cl. ..................... 219/406; 219/407; 219/408; 219/409

[58] Field of Search ............... 219/406, 407, 408, 409, 219/422, 457, 459, 465, 466, 546; 432/209, 225

[56] References Cited

U.S. PATENT DOCUMENTS

| | | | |
|---|---|---|---|
| 1,057,745 | 4/1913 | Kohn | 219/546 |
| 1,645,867 | 10/1927 | Louthan | 338/285 X |
| 1,910,700 | 5/1933 | LeBau | 219/462 |
| 1,923,644 | 8/1933 | Simpson | 373/110 |
| 2,708,704 | 5/1955 | Duda, Jr. | 219/10.79 |
| 2,820,076 | 1/1958 | Lillienberg | 373/130 |
| 2,891,303 | 6/1959 | Stevenson | 428/596 |
| 2,896,004 | 7/1959 | Duffy et al. | 13/22 |
| 3,134,836 | 5/1964 | Malinowski | 373/130 |
| 3,500,444 | 3/1970 | Hesse et al. | 219/544 |
| 4,154,975 | 5/1979 | Sauder | 219/531 |
| 4,161,391 | 7/1979 | Parker | 432/209 |
| 4,243,874 | 1/1981 | Fischer | 219/467 |
| 4,445,024 | 4/1984 | Carden | 219/390 |
| 4,575,619 | 3/1986 | Porzky | 219/542 |
| 4,829,282 | 5/1989 | Waugh et al. | 338/279 |

FOREIGN PATENT DOCUMENTS

| | | |
|---|---|---|
| 3233181 | 3/1984 | Fed. Rep. of Germany . |
| 770071 | 9/1934 | France . |
| 2480057 | 10/1981 | France . |

*Primary Examiner*—Rey330112Bruce A.
*Assistant Examiner*—Tuan Vin330211 To

[57] ABSTRACT

A heating unit combining a block of thermal and electrical insulating material and a pair of electrical resistance elements in which the block contains a mass of ceramic fibers bound together and has an elongated slot with confronting walls rising to the surface of the block from opposite sides of a floor, and the resistance elements are in the form of thin members constructed of continuous resistance wires which are provided with opposite bends to form a serpentine shape, the bends being embedded in the opposite walls of the block to secure the electrical resistance elements on the block adjacent to the floor of the slot.

16 Claims, 2 Drawing Sheets

FURNACE AND KILN CONSTRUCTION AND THERMAL INSULATION AND HEATING UNIT THEREFOR

This application is a continuation of applicant's copending application, Ser. No. 07/425,935, filed Oct. 24, 1989, now abandoned.

BACKGROUND OF THE INVENTION

The present invention relates to furnaces and kilns for heat treating materials at relatively high temperatures and to combination thermal insulating and heating units which are used in forming the enclosure for such furnaces and kilns, hereafter referred to as "furnaces."

The present invention is an improvement upon ovens utilizing the thermal insulating and heating unit of the present inventor's U.S. Pat. No. 4,575,619 entitled ELECTRICAL HEATING UNIT WITH SERPENTINE HEATING ELEMENT granted on Mar. 11, 1986, and an improvement on such thermal insulating and heating units. That patent describes a combination thermal insulating and heating unit in which a serpentine heating element is disposed on the floor of a slot which extends into a block of ceramic fibers. The patent also describes the process of making such a combination thermal insulating and heating unit of ceramic fibers in which a serpentine heating element is supported on a narrow elongated strip which rests on a liquid permeable screen at the bottom of a vacuum box, the heating element having reverse bends protruding from both sides of the elongated strip. A slurry of ceramic fibers, water and a binder is then poured into the vacuum box covering the serpentine heating element to a satisfactory depth. A portion of the water and binder of the slurry is then permitted to drain from the vacuum box, and thereafter a vacuum is drawn below the screen to cause more of the water and binder of the slurry to drain through the screen. The vacuum also causes the fibers to pack tightly forming a mat with sufficient integrity to permit removal from the vacuum box. The thin strip is then removed exposing the central portions of the heating element on the bottom or floor of an elongated slot formed by the supporting strip for the heating element. The mat is then cured in an oven to form a combination thermal insulation and heating element in which the element is disposed at the bottom or floor of a slot.

One of the advantages of the structure described above, is that the serpentine heating element is securely mounted on the block of ceramic fibers by outwardly extending bends which are embedded in the ceramic fiber block, but a portion of the heating element is directly exposed to the interior of the enclosure by the slot to provide efficient heat transfer. While this construction has proven to provide a superior mounting construction for the heating element on the ceramic fiber mat and good heat transfer, it places restrictions on the heating element itself which have made it difficult to increase the heat transferred from a given area of the combination thermal insulating and heating unit. As a result of these restrictions, efforts to shorten the time required to bring a furnace constructed with such thermal insulating and heating units to operating temperature have been frustrated. It is a primary object of the present invention to provide a furnace utilizing combination insulating and heating units with electrical heating elements anchored in a ceramic fiber block in which the furnace can be brought to operating temperature in a significantly shorter time than prior furnaces.

The heat produced by an electrical resistance element is determined by the formula:

$$P = I^2 R;$$

where P is the power in watts, I is the electrical current through the resistance element in amperes, and R is the resistance in ohms. Accordingly, the thermal energy produced by a given element may be increased by increasing the current, or increasing the resistance of the resistance element, or a combination of both. The current through the heating element, however, is related to the resistance of the element by the formula:

$$I = E/R;$$

where E is the potential of the power source. Hence, the current through the element can also be increased by increasing the potential of the power source. This technique for increasing the heat liberated from a given area of heating element is generally not practical due to the cost of increasing the potential of the power source, and the thermal strain placed upon the heating element. There is a limit of how many watts per square inch of wire surface area can be liberated. If the watt input is too high the heating wire will burn out.

At temperatures above about 700° C., practically all of the heat transferred from a heating element is through radiation, and it is only at lower temperatures that convection contributes to heat transfer. Since the combination thermal insulating and heating units of the present invention are intended for furnaces operating at temperatures well above 700° C., only radiation can be considered for heat transfer from the element. Radiant heat transfer from the element, however, is a function of the temperature of the element and the surface area of the element, and can not be increased by external effects, as can be done with convection. Radiant heat transfer per unit of area of the heating element is a function of the temperature of the element, and there is a maximum operating temperature for a given heating element without accelerating deterioration of the element. Hence, increasing the radiant heat transfer from a given heating element by increasing the current through the element can only be practiced if the element is not operating at capacity.

The most practical technique for increasing the heat transfer from a given area of a heating unit operating above 700° C. is to increase both the electrical current and the area of the heating element. The current through the electrical heating element can be increased by decreasing the resistance of the element or increasing the potential of the power source, but the area of the electrical resistance heating element of the inventor's U.S. Pat. No. 4,575,619 may not readily be increased. These electrical resistance elements require a plurality of 180 degree bends in opposite directions, and accordingly the elements must be of a material and size to permit formation. Further, the 180 degree bends are preferably on as short a radius as possible in order to maximize the length of the heating element disposed on a unit of area of the ceramic pad. In addition, the elements are constructed of solid resistance wire material to maximize the surface area for a given resistance per unit of length, and hence are subject to cracking during formation. As a result, it has proven to be difficult to increase the thermal output per unit of area of the combination thermal insulating and heating units constructed in the manner of U.S. Pat. No. 4,575,619.

It is therefore an object of the present invention to provide a combination thermal insulating and heating unit capable of operation at temperatures in excess of 700° C. and constructed with a serpentine heating element in the manner of U.S. Pat. No. 4,575.619 which will transfer more heat per unit of area than the heating units of prior constructions without shortening the useful life of the heating element, and to provide a furnace utilizing the improved insulating and heating unit.

It is also an object of the present invention to provide such a combination thermal insulating and heating unit with the improved construction at a relatively small increase in cost over the prior construction.

SUMMARY OF INVENTION

The inventor has found that combination thermal insulating and heating units for use in furnaces operated at temperatures in excess of 700° C. may be constructed with a rigid block of ceramic fibers provided with an elongated slot extending therein and a plurality of elongated serpentine electrical resistance elements disposed within the slot and adjacent to the floor of the slot. Each of the resistance elements has a first plurality of U-shaped bends disposed on one side of the axis of elongation of the heating element a second plurality of U-shaped bends disposed on the other side of the axis of elongation of the heating element, and the bends engage the block. The inventor has found that the heating elements may be electrically interconnected at their respective ends and connected to a power source to produce up to the maximum radiant heat transfer per unit of area for each of the heating elements. Further, a plurality of substantially identical heating elements may be stacked one above the other on the narrow strip in the process for making heating elements described in U.S. Pat. No. 4,575,619, the ends of the elements welded together, and the process completed as described to fabricate a combination thermal insulating and heating unit capable of operation at temperatures above 700° C. The inventor has found that two serpentine electrical resistance elements stacked together in the improved insulating and heating unit form a particularly desirable unit and transfer twice the heat of a unit utilizing only one such heating element.

The inventor has also found that a furnace utilizing such an improved combination thermal insulating and heating unit can be brought to operating temperature in an unexpectedly short time, even when that temperature is in excess of 1000° C.

DESCRIPTION OF THE DRAWINGS

For a more complete understanding and appreciation of the invention, reference is made to the drawings, in which.

DESCRIPTION OF PREFERRED EMBODIMENTS

Figure 1:
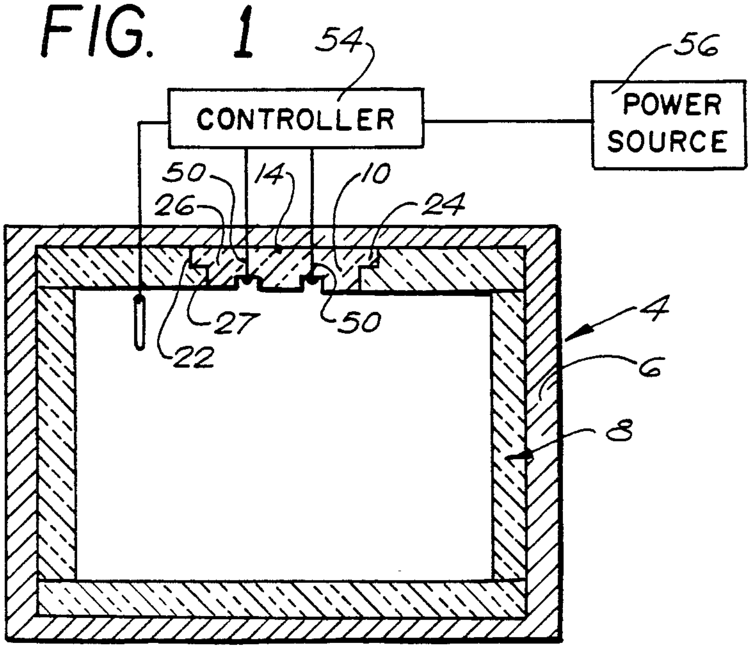
FIG. 1 is a fragmentary sectional view of a furnace constructed according to the present invention, portions thereof being diagramatic.

FIG. 1 illustrates a furnace 4 constructed according to the teachings of the present invention. The furnace 4 has a frame 6 which supports an interior thermal insulating liner 8. The insulating liner 8 has at least one combination thermal insulating and heating unit 10 constructed according to the present invention.

The thermal insulating and heating unit 10 has a molded block 12 of thermal insulating material. The block 12 is preferably molded of inorganic ceramic fibers of the type disclosed in U.S. Pat. No. 3,500,444 to W. J. Hesse, et al. In such a block, high refractory compositions, such as silica or quartz, magnesia, alumina-silica, produce inorganic fibers which exhibit resistance to deterioration at temperatures up to the order of 1400° C. Blocks made of such compositions are relatively porous and provide excellent thermal insulation. Further, such blocks are readily molded into various shapes and are thus particularly suitable for forming the walls of a furnace.

The block 12 has two flat parallel surfaces 14 and 16, a face 18 extending between the surfaces 14 and 16, sides 20 and 22, and a back, not shown. Sides 20 and 22 are provided with outwardly extending quadrangular steps 24 and 26 which mate with recesses 27 in adjacent portions of the liner 8 to form a closed liner 8 for the furnace 4. The surfaces 14 and 16 are flat in the illustrated embodiment, but may be curved to match the contour of the liner 8.

Figure 2:
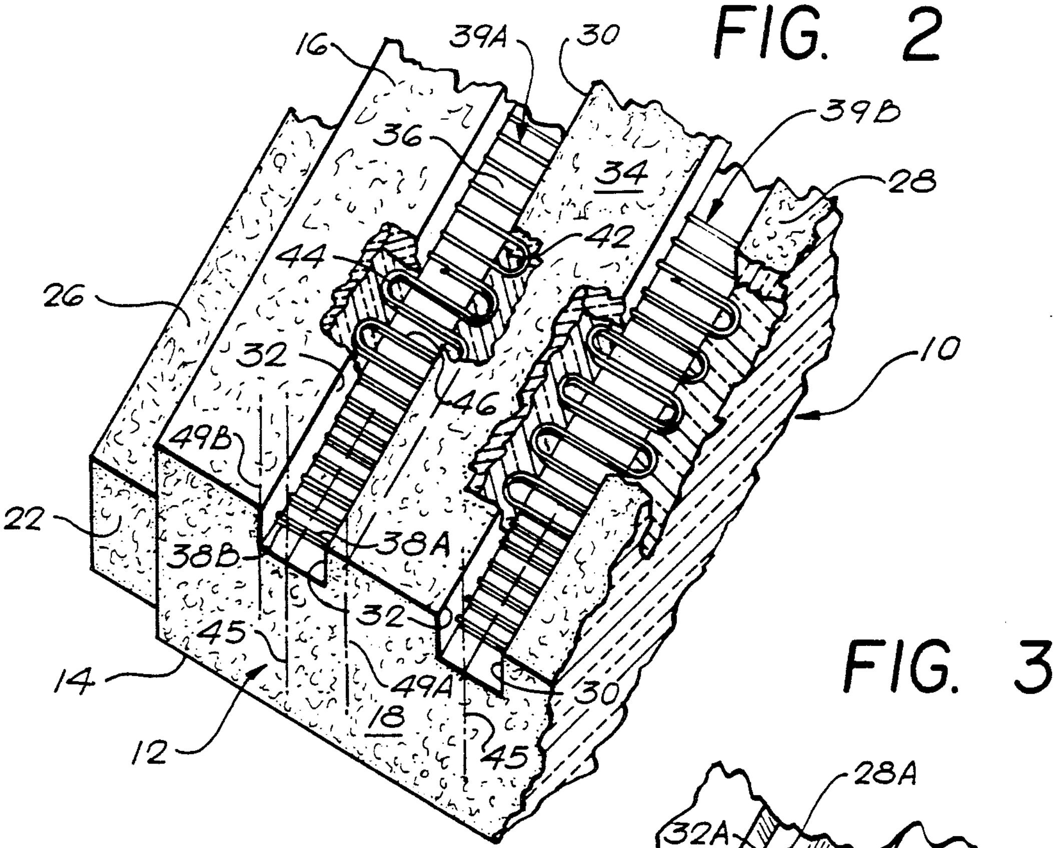
FIG. 2 is a fragmentary isometric view of a combination thermal insulating and heating unit illustrated in the furnace of FIG. 1.
Figure 3:
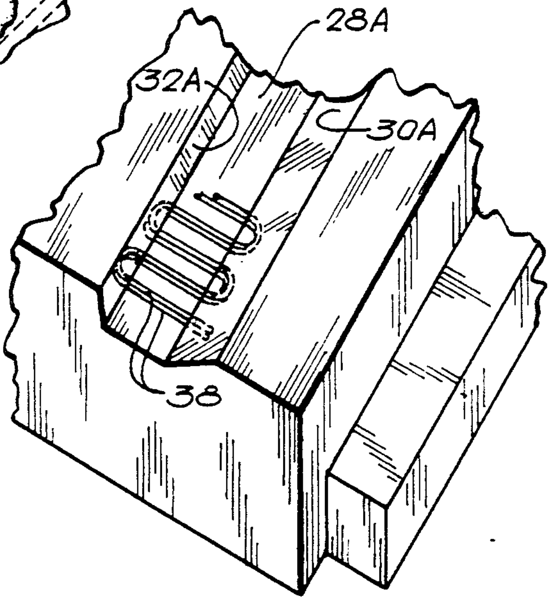
FIG. 3 is a fragmentary isometric view of an alternative construction of a combination thermal insulating and heating unit to that illustrated in FIG. 2.
Figure 4:
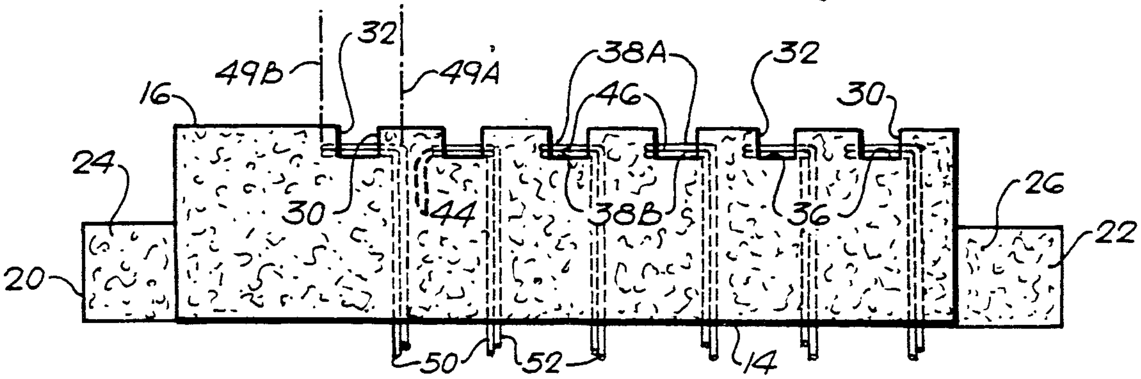
FIG. 4 is a front elevational view of the thermal insulating and heating unit of FIG. 2.

The block 12 is provided with a plurality of slots 28 which extend into the surface 16 of the block, the slots 28 being elongated and having parallel walls 30 and 32, as illustrated in FIGS. 2 and 4. In the modified construction of FIG. 3, slots 28A in block 12A have oblique opposed walls 30A and 32A. As illustrated in FIGS. 2 and 4, adjacent slots 28 are spaced by strips 34 and are disposed parallel to each other. Each of the slots 28 extends into the block 12 from the surface 16 essentially the same distance and forms a flat surface or floor 36 remote from the surface 16. A pair of serpentine heating elements 38A and 38B are disposed on the floor 36 of the slot 28 with one element 38B disposed directly above the other element 38A and vertically aligned with element 38A.

Figure 5:
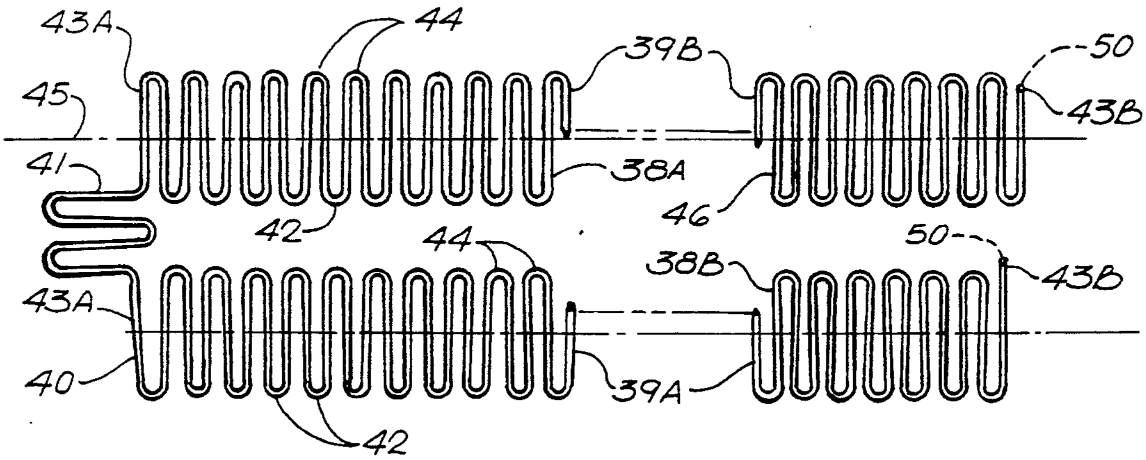
FIG. 5 is a fragmentary plan view of the heating element illustrated in FIG. 1 through 4.

As illusrtated in FIG. 5, the heating elements 38A and 38B are identical, and each of said heating elements is an elongated, hollow electrical resistance wire 40 with bends 42 and 44. The elements 38A and 38B each have two linear identical sections 39A and 39B which are disposed parallel to each other and designed to be accommodated by two adjacent slots 28. The two sections 39A and 39B are an integral unit coupled at one end 43A by a plurality of loops 41. The bends 42 form a first group and are disposed on one side of the axis of elongation 45 and are separated from each other y a fixed distance along the axis 45. The bends 44 form a second group and are disposed on the other side of the axis of elongation and are separated from each other by the same fixed distance. Each of the bends 44 of the second group is located between adjacent bends 42 of the first group, except for the last bend at each end of the wire

40. Each of the bends 42 and 44 have the same radius of curvature, and each bend 42 is separated from the bend 44 by a straight connecting section 46 of resistance wire. The connecting sections 46 are of equal length, thereby positioning the bends 42 of the first group tangent to a plane 49A perpendicular to the surface 16 and parallel to the axis 45 of elongation of the heating element 38A or 38B, and positioning the bend 44 of the second group tangent to a plane 49B perpendicular to the surface 16 and parallel to the axis 45 of elongation of the heating element 38A or 38B. The planes 49A and 49B traverse the strips 34 on opposite sides of the slot 28, so that a portion of each bend 42 and 44 is embedded in the block 12.

Each of the bends 42 and 44 encompasses an angle of 180° in the preferred construction illustrated in the figures, and, therefore, the straight sections 46 are parallel to each other and perpendicular to the axis 45 of elongation of the heating elements 38A and 38B. As a result of this construction, the heating elements 38A and 38B approach the maximum mass of heating element per unit of length for a given diameter wire 40 and bends 42 and 44 of a given radius of curvature. The invention may be practiced however using bends 42 and 44 of less than 180°, and the sections between each bend 42 and 44 may be curved rather than straight. The wire 40 as illustrated in FIG. 3 is cylindrical in shape and hollow to maximize surface area for a given resistance per unit of length, but the wire may be flat, square, rectangular, or the like.

The sections 39A and 39B of the heating elements 38A and 38B are disposed in adjacent slots 28 and each section is disposed in one of the slots 28 in abutment with the floor 36 thereof. The straight connection sections 46 of the resistance elements 38A and 38B extend through the walls 30 and 32, and the bends 42 and 44 of each element 38A and 38B are embedded in the strips 34 of the block 12 adjacent to each slot 28. The heating elements 38A and 38B are retained in assembly with the block 12 due to the engagement of the fibers of the block 12 with the bends 42 and 44 of the heating elements 38A and 38B.

As illustrated in FIGS. 2 and 4, a portion of the connecting sections 46 of the heating elements 38A and 38B can be embedded in the walls 30 and 32 of the block 12. To optimize heat transfer, the bends 42 and 44 should merely abut the walls 30 and 32 of the slot 28. The block 12 has little strength, and the heating element 38A or 38B may exhibit considerable mass. Hence, it is generally necessary to at least partially embed the bends 42 and 44 of each heating element 38A and 38B into the block 12. The depth of penetration of the bends 42 and 44 of each heating element 38A and 38B into the block 12 changes upon heating of the resistance elements 38A and 38B. Expansion of the heating elements 38A and 38B occurs along the entire axis of the element, but expansion of the connecting sections 46 force the bends 42 and 44 against the fibers of the block 12, thereby causing the bends to further penetrate the strips 34. The block 12 however has little shear strength, and the expansion of the resistance element produces a compressional force against the block 12 which significantly aids in retaining the heating elements 38A and 38B in attachment with the block 12, particularly at elevated temperatures. For each heating element 38A or 38B, each of the bends 42 and 44 is embedded into the block 12 by a distance generally no greater than one-fourth of the distance between the bends 42 and the bends 44, so that at least one-half of the connection section 46 of the resistance element 38A or 38B is disposed on the floor 36 of the slot 28.

Adjacent slots 28 must be separated by sufficient distance so that the strip 34 between the slots provides adequate electrical insulation between adjacent electrical heating elements 38A and 38B. The ceramic fibrous material of the block 12 is an electrical insulator, but the electrical insulating properties depend upon the associated environment and temperature in which the block is used.

In one preferred construction, six slots 28 are disposed in the flat surface 16 of a block 12, each slot extending completely from the front surface 18 of the block to the back surface to a depth of ¼ inch at the floor 36. Each slot 28 has a width measured perpendicular to the walls 30 and 32 of ⅝ inch. The electrical resistance heating elements 38A and 38B are constructed of 15 gauge Kanthal A-1 heating element wire with a cylindrical cross section and a resistance of $0.12_7$ ohms per inch. The bends 42 of the heating elements 38A and 38B extend to plane 49A and the bends 44 extend to the plane 49B, and the plans 49A and 49B are displaced for each other by distance of ⅞ inch, and hence approximately ⅛ inch of each bend 42 and 44 is embedded in the block 12.

The ends 43B of the elements 38A and 38B have depending stubs 50 which extend normally from the plane of the element. The two elements 38A and 38B are electrically and mechanically interconnected by connecting the stubs 50 of the two elements 38A and 38B, as by a weld 52 illustrated in FIG. 4.

In one particular construction of electrical heating elements 38A and 38B, as illustrated in FIG. 5, the total length of No. 15 gauge Kanthal A-1 heating wire 40 is 6 foot, 9 inches, including both sections 39A and 39B. Each of the sections 39A and 39B is 13 inches in length, and the element is otherwise as described above. The element is designed to operate in a furnace at 1300° C., and a controller 54 is connected electrically between a direct current power source 56 and the interconnected stubs 50 of the heating elements 38A and 38B to limit the furnace temperature to the control value. In a particular experiment, a single element 38A with two sections 39A and 39B was subjected to 3163.4 watts by flowing 13.6 amperes through the element with a direct current power source of 232.6 volts. When a part of the thermal insulating liner of a particular furnace, such as described in FIG. 1, the furnace was heated from room temperature to 1199° C. in a period of 25 minutes. The element was loaded to transfer 30.5 watts per square inch of element surface under these conditions.

When a second identical element 38B was stacked upon the first element 38A, and the stubs thereof welded together to provide mechanical and electrical connections, the resistance of the assembly of elements 38A and 38B dropped to 8.66 ohms from 17.27 ohms for a single element 38A. As a result, the current flowing through the assembled elements 38A and 38B increased to 23.5 amperes from 13.6 amperes for a single element 38A, and the power increased to 5449.65 watts. The voltage of the power source fell very slightly when driving both elements, i.e. from 232.6 volts d.c. to 231.9 volts. The heat insulating and heating unit 10 with a dual heater unit 38A and 38B heated the same furnace as described above to a temperature of 1200° C. from room temperature in about 5 and ½ minutes. The reduction in the time required to bring the temperature of that particular furnace from 25 minutes to 5 and ½ minutes exceeds expectations.

One reason for the reduction in the time required to bring the temperature of the furnace to operating temperature is that the temperature of the heating elements 38A and 38B are not greatly above the furnace temperature, thus indicating that the heat produced by the electrical energy is being transferred from the element into the furnace. In the experiment described above, the heating elements 38A and 38B stabilized at 1246° C. with a stable furnace temperature of 1200° C., a temperature only 6° C. over that of a single element 38A. Stability was obtained by operating the furnace for a period of 60 minutes at 1200° C. before the readings were taken. It is believed that the elements 38A and 38B transfer heat almost entirely by radiation at these temperatures, and accordingly, the presence of element 38B does not appreciably affect the operation of the element 38A.

It should also be noted that the heater wire 40 is not electrically insulated, and that the two heating elements 38A and 38B are in contact at many points along the elements. Arcing between the elements 38A and 38B does not occur, because the elements are at approximately the same electrical potential at all points along the elements Elimination of arcing is assured by stacking one element 38B on the other element 38A. The mechanical position of the elements tends to be maintained as a result of welding the ends of the element 38B on the ends of the element 38A, and these welds provide the electrical connection between the elements 38A and 38B.

Figure 6:
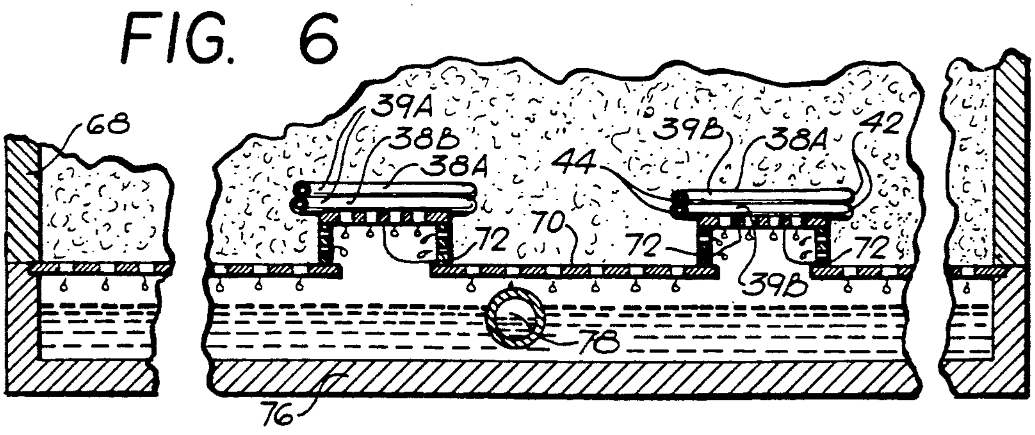
FIG. 6 is a diagramatic view of processing apparatus for producing the combination thermal insulating and heating unit illustrated in FIGS. 1, 2 and 4.

FIG. 6 illustrates, somewhat diagrammatically, apparatus for producing the panels for FIGS. 1, 2, 4 and 5. FIG. 6, a frame 68 which is provided with a horizontal bottom 70. The bottom 70 supports a plurality of elongated upwardly rising strips 72 forming plateaus. Each of the strips has a flat rectangular upper surface 74. The bottom 70, entire strips 72 and upper surface 74 are of porous material.

Frame 68 is mounted on a suction box 76 which extends below the bottom 70 of the frame. The suction box 76 has an orifice 78 which is adapted to be connected to a means not shown, to evacuate the suction box 76.

In practice, the opposite ends 43A and 43B of a pair of resistance heating elements 38A and 38B are welded together and a pair of the assembled elements 38A and 38B are then placed on each strip 74, with the bends 42 and 44 overlapping opposite sides of the strip 74. With the heating elements thusly positioned, the frame 68 is filled to a level above the resistance elements 38A and 38B with a slurry of water, binder, and inorganic fibers of the type described in U.S. Pat. No. 3,500,444 of W. K. Hesse, et al. The liquid portion of the slurry is permitted to flow through the bottom 70 of the frame 68, and suction is applied to the suction box 76 to withdraw a larger portion of the liquid portion of the slurry on the bottom 70. Further, the porous strip 72 permits the passage of the liquid portion of the slurry, and the fibers will be deposited upon the resistance heating elements 38A and 38B and the walls of the strip 72. It will be noted in FIG. 6 that a plurality of strips 72 are employed to mold in situ a plurality of electrical heating elements 38A and 38B. The block thus formed is thereafter removed from the frame 68 and dried.

Those skilled in the art will devise many uses for the present invention beyond those here disclosed. Further, those skilled in the art will devise modifications of the heating panels here disclosed within the scope of the present invention. It is therefore intended that the scope of the present invention be not limited by the foregoing disclosure but rather only by the appended claims.

The invention claimed is:

1. A combination thermal insulating and heating unit for use in a furnace adapted to operate at temperatures above 700° C. comprising, in combination, a mass of elongated ceramic fibers bound together to form a rigid block with a surface adapted to face the interior of a furnace, said elongated fibers elongated fibers being electrically nonconducting and the block being an electrical and thermal insulator, said block having an elongated slot extending therein from the surface, said elongated slot forming opposed walls on opposite sides thereof extending into the block and a floor disposed between the walls, a first elongated electrical resistance element extending between a first end thereof and a second end thereof disposed within the slot adjacent to the floor thereof, said first resistance element having a plurality of bends forming a first group disposed on one side of the axis of elongation of the resistance element and engaging the block at one of the opposed walls of the slot, said first resistance element having a plurality of bends forming a second group disposed on the other side of the axis of elongation of the resistance element and engaging the block at the other of the opposed walls of the slot, the bends of the first group being electrically connected in series with the bends of the second group, and a second elongated electrical resistance element extending between a first end thereof and a second end thereof disposed within the same slot adjacent to the floor thereof, said second resistance element having a plurality of bends forming a first group disposed on one side of the axis of elongation of the second resistance element and engaging the block at one of the opposed walls of the slot, said second resistance element having a plurality of bends forming a second group disposed on the other side of the axis of elongation of the second resistance element and engaging the block at the other of the opposed walls of the slot, the bends of the first group of the second resistance element being electrically connected in series with the bends of the second group of said element, the first end of the second resistance element being electrically connected to the first end of the first resistance element, and the second end of the second resistance element being electrically connected to the second end of the first resistance element.

2. A combination thermal insulating and heating unit for use in a furnace adapted to operate at temperatures above 700° C. comprising the combination of claim 1 wherein the first and second resistance elements are elongated metallic resistance elements.

3. A combination thermal insulating and heating unit for use in a furnace adapted to operate at temperatures above 700° C. comprising the combination of claim 1 wherein the first group of bends and the second group of bends of the first and second elements are a substantially 180 degree bends.

4. A combination thermal insulating and heating unit for use in a furnace adapted to operate at temperatures above 700° C. comprising the combination of claim 2 wherein the first ends of the first and second resistance elements are attached to each other, and the second ends of the first and second resistance elements are attached to each other.

5. A combination thermal insulating and heating unit for use in a furnace adapted to operate at temperatures above 700° C. comprising the combination of claim 2 wherein the first and second resistance elements are hollow tubular members.

6. A combination thermal insulating and heating unit for use in a furnace adapted to operate at temperatures above 700° C. comprising the combination of claim 5 wherein at least a portion of the bends of the first group and a portion of the bends of the second group of the first and second resistance elements are embedded in the one wall and the other wall respectively.

7. A combination thermal insulating and heating unit for use in a furnace adapted to operate at temperatures above 700° C. comprising the combination of claim 6 wherein the walls of the slot are normal to the surface and parallel to each other, the first bends of the first and second resistance elements terminating on a first plane parallel to the one wall, and the second bends of the first and second resistance elements terminating on a second plane parallel to the other wall of the slot.

8. A combination thermal insulating and heating unit for use in a furnace adapted to operate at temperatures above 700° C. comprising the combination of claim 7 wherein the first and second elements are a substantially identical pair.

9. A furnace for high temperature treatment of materials comprising an enclosure having a thermally insulating layer on the interior surface thereof, said thermally insulating layer including a combination heating and thermal insulating unit comprising a mass of ceramic fibers bound together to form a rigid block with a surface confronting the interior of the enclosure, said ceramic fibers being electrically nonconducting and the block being an electrical and thermal insulator, said block having an elongated slot extending therein from the surface, said slot forming opposed walls on opposite sides thereof extending into the block and a floor disposed between the walls and spaced from the surface, a first elongated electrical resistance element extending between a first end thereof and a second end thereof disposed within the slot adjacent to the floor thereof, said first resistance element having a plurality of bends forming a first group disposed on one side of the axis of elongation of the first resistance element and engaging the block at one of the opposed walls of the slot, said first resistance element having a plurality of bends disposed on the other side of the axis of elongation of the first resistance element forming a second group and engaging the block at the other of the opposed walls of the slot, the bends of the first group of the first resistance element being electrically connected in series with the bends of the second group of the first resistance element, and a second elongated electrical resistance element extending between a first end thereof and a second end thereof disposed within the slot adjacent tot he floor thereof, said second resistance element having a plurality of bends disposed on one side of the axis of elongation of the second resistance element forming a first group and engaging the block at the one of the opposed walls of the slot, said second resistance element having a plurality of bends disposed on the other side of the axis of elongation of the second resistance element forming a second group and engaging the block at the other of the opposed walls of the slot, the bends of the first group of the second resistance element being electrically connected in series with the bends of the second group of the second resistance element, the first end of the second resistance element being electrically connected to the first end of the first resistance element, and the second end of the second resistance element being electrically connected with the second end of the first resistance element, a source of electrical energy, and means for connecting the source of electrical energy across the first and second ends of the first and second resistance elements, and said connecting means including means for controlling the flow of electrical current through the first and second resistance elements responsive to the temperature within the enclosure to maintain the temperature.

10. A furnace for high temperature treatment of materials comprising the combination of claim 9 wherein the first and second resistance elements are elongated metallic resistance elements.

11. A furnace for high temperature treatment of materials comprising the combination of claim 9 wherein the first group of bends and the second group of bends of the first and second elements are a substantially 180 degree bends.

12. A furnace for high temperature treatment of materials comprising the combination of claim 9 wherein the first ends of the first and second resistance elements are attached to each other, and the second ends of the first and second resistance elements are attached to each other.

13. A furnace for high temperature treatment of materials comprising the combination of claim 9 wherein the first and second resistance elements are hollow tubular members.

14. A furnace for high temperature treatment of materials comprising the combination of claim 9 wherein at least a portion of the bends of the first group and a portion of the bends of the second group of the first and second resistance elements are embedded in the one wall and the other wall respectively.

15. A furnace for high temperature treatment of materials comprising the combination of claim 14 wherein the walls of the slot are normal to the surface and parallel to each other, the first bends of the first and second resistance elements terminating on a first plane parallel to the one wall, and the second bends of the first and second resistance elements terminating on a second plane parallel to the other wall of the slot.

16. A furnace for high temperature treatment of materials comprising the combination of claim 14 wherein the first and second elements are a substantially identical pair.

* * * * *

UNITED STATES PATENT AND TRADEMARK OFFICE

CERTIFICATE OF CORRECTION

PATENT NO. : 5,126,535

DATED : June 30, 1992

INVENTOR(S) : Ludwig Porzky

It is certified that error appears in the above-identified patent and that said Letters Patent is hereby corrected as shown below:

Column 4, line 62, "y" should be --by--.

Column 8, line 12, delete the repetition of "elongated fibers".

Column 9, line 57, delete "tot he" and insert --to the--.

Signed and Sealed this

Seventeenth Day of August, 1993

Attest:

BRUCE LEHMAN

*Attesting Officer* *Commissioner of Patents and Trademarks*